United States Patent
Satish et al.

(10) Patent No.: US 8,918,873 B1
(45) Date of Patent: Dec. 23, 2014

(54) SYSTEMS AND METHODS FOR EXONERATING UNTRUSTED SOFTWARE COMPONENTS

(75) Inventors: Sourabh Satish, Fremont, CA (US); Shane Pereira, Newbury Park, CA (US); Wilson Meng, Los Angeles, CA (US); Yoshihiro Yasuda, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 531 days.

(21) Appl. No.: 12/550,198

(22) Filed: Aug. 28, 2009

Related U.S. Application Data (60) Provisional application No. 61/222,913, filed on Jul. 2, 2009.

(51) Int. Cl.
*G06F 12/14* (2006.01)

(52) U.S. Cl.
USPC ............. 726/23; 713/170; 713/181; 726/22; 726/30; 717/174; 717/175

(58) Field of Classification Search
USPC ............. 726/22, 30; 713/161, 170, 173, 181
See application file for complete search history.

(56) References Cited

U.S. PATENT DOCUMENTS

| | | | | |
|---|---|---|---|---|
| 6,922,782 | B1 * | 7/2005 | Spyker et al. | 713/161 |
| 7,124,408 | B1 * | 10/2006 | Parthasarathy et al. | 717/170 |
| 2002/0023224 | A1 * | 2/2002 | Safa | 713/190 |
| 2005/0132179 | A1 * | 6/2005 | Glaum et al. | 713/1 |

OTHER PUBLICATIONS

Satish, Sourabh; U.S. Appl. No. 12/056,379, filed Mar. 27, 2008.
Satish, Sourabh; U.S. Appl. No. 12/049,751, filed Mar. 17, 2008.
Nachenberg, Carey S.; U.S. Appl. No. 12/415,834, filed Mar. 31, 2009.

* cited by examiner

*Primary Examiner* — Jung Kim
*Assistant Examiner* — Ayoub Alata
(74) *Attorney, Agent, or Firm* — ALG Intellectual Property, LLC (57) ABSTRACT

The instant disclosure describes various exemplary systems and methods for exonerating an untrusted software component based solely on a trusted software component's non-optional or "hard" dependency on the untrusted software component. In one example, a method for exonerating untrusted software components in this manner may include: 1) identifying a dependent software component, 2) determining that the dependent software component is a non-optional dependent component of at least one trusted software component, and then 3) classifying the dependent software component as a trusted software component. As detailed herein, such a method may enable security software to quickly and efficiently exonerate untrusted components by association without having to scan or perform other intrusive and/or resource-intensive security operations on such untrusted software components.

17 Claims, 8 Drawing Sheets

SYSTEMS AND METHODS FOR EXONERATING UNTRUSTED SOFTWARE COMPONENTS

CROSS REFERENCE TO RELATED APPLICATION

This application claims the benefit of U.S. Provisional Application No. 61/222,913, filed 2 Jul. 2009, the disclosure of which is incorporated, in its entirety, by this reference.

BACKGROUND

Computer-security researchers have estimated that up to 50% of computer-security threats have some form of dependent or shared-object-based component. These threats typically "inject" malicious dependent software components (such as DLLs) into otherwise legitimate processes. The malicious code contained within the injected component may then perform malicious actions under the cover of an otherwise legitimate process.

For example, a malware developer may register a malicious DLL (by, for example, tricking a user into running a malicious executable file or by exploiting a buffer overflow in a legitimate application) for loading by a trusted application, such as MICROSOFT WORD for WINDOWS. In this example, when MICROSOFT WORD loads, the malicious DLL will also load and launch, potentially scheduling background threats that launch attacks directly from the process space associated with MICROSOFT WORD.

Since a trusted process may load a large number of dependent software components, and because the trustworthiness of a large majority of these components may be unknown (since, for example, such dependent software components may lack trust indicators, such as digital signatures), attempting to detect, track, and determine the trustworthiness of each of these components may severely impact system performance. Moreover, because malicious dependent software components may run under the cover of an otherwise legitimate process, it is sometimes difficult to eliminate malicious dependent software components without also harming their legitimate host processes.

SUMMARY

As will be described in greater detail below, the instant disclosure generally relates to systems and methods for exonerating untrusted software components. In one example, an exemplary system may accomplish this task by: 1) identifying a dependent software component (such as an unsigned DLL), 2) determining that the dependent software component represents a non-optional dependent component (i.e., a "hard" dependency) of at least one trusted software component (such as a digitally signed executable file or process), and then 3) classifying the dependent software component as trusted.

In some examples, the system may identify or detect the dependent software component when it is loaded by a trusted process. In this example, the system may determine that the dependent software component represents a non-optional dependent component of at least one trusted software component by determining that that the dependent software component is identified in a dependency list (such as an import address table or file manifest) of the trusted process. The system may make this determination in real time (i.e., prior to allowing the trusted process to load the dependent software component) or in a low-priority or background thread to conserve system resources.

In other examples, the system may determine that the dependent software component represents a non-optional dependent component of at least one trusted software component by: 1) obtaining dependency metadata for the dependent software component (i.e., information that indicates whether the dependent software component represents a non-optional dependency of any trusted software components) from a reputation service and then 2) determining, by analyzing the dependency metadata, that the dependent software component represents a non-optional dependent component of at least one trusted software component.

Upon classifying the dependent software component as trusted, the system may: 1) identify at least one additional instance of the dependent software component that is loaded by a process on the system and then 2) classify the additional instance(s) of the dependent software component as trusted.

By exonerating a dependent software component based solely on a trusted software component's non-optional or "hard" dependency on the dependent software component, the various systems and methods disclosed herein may quickly and efficiently exonerate dependent components by association without having to scan or perform other intrusive and/or resource-intensive security operations on the dependent software component. As such, these systems and methods may detect dependent-component-based security threats without unduly impacting system performance.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure generally relates to systems and methods for exonerating untrusted software components. In one example, as will be explained in greater detail below, an exemplary method for accomplishing this task may include: 1) identifying a dependent software component (such as an unsigned DLL), 2) determining that the dependent software component represents a non-optional dependent component (i.e., a "hard" dependency) of at least one trusted software component (such as a digitally signed executable file or process), and then 3) classifying the dependent software component as trusted.

The term "software component," or sometimes simply "component," as used herein, generally refers to a software package or file that encapsulates a set of functions or data. In some examples, a software component may also refer to a process launched by a software package or file. Similarly, the term "dependent software component," or sometimes simply "dependent component," as used herein, generally refers to software packages or files that contain code and/or data that may be shared or relied upon by independent processes or programs. Examples of dependent components include, without limitation, shared objects and libraries such as DLLs and .so files.

In addition, for purposes of this disclosure, a "trusted software component" may refer to any legitimate or valid (i.e., non-malicious) software package or file. Examples of trusted software components include, without limitation, software components that have been digitally signed by a trusted entity, software components that have been scanned and exonerated by security software, and software components that have been assigned acceptable reputation scores by a reputation service, as discussed in greater detail below. In contrast, an "untrusted software component" may refer to a component whose trust status has yet to be determined. Examples of untrusted software components include, without limitation, unsigned software components, software components that have not been scanned or exonerated by security software, and software components that have been not been assigned reputation scores by a reputation service. In some examples, the dependent components described herein may represent untrusted components, such as unsigned DLLs.

Figure 1:
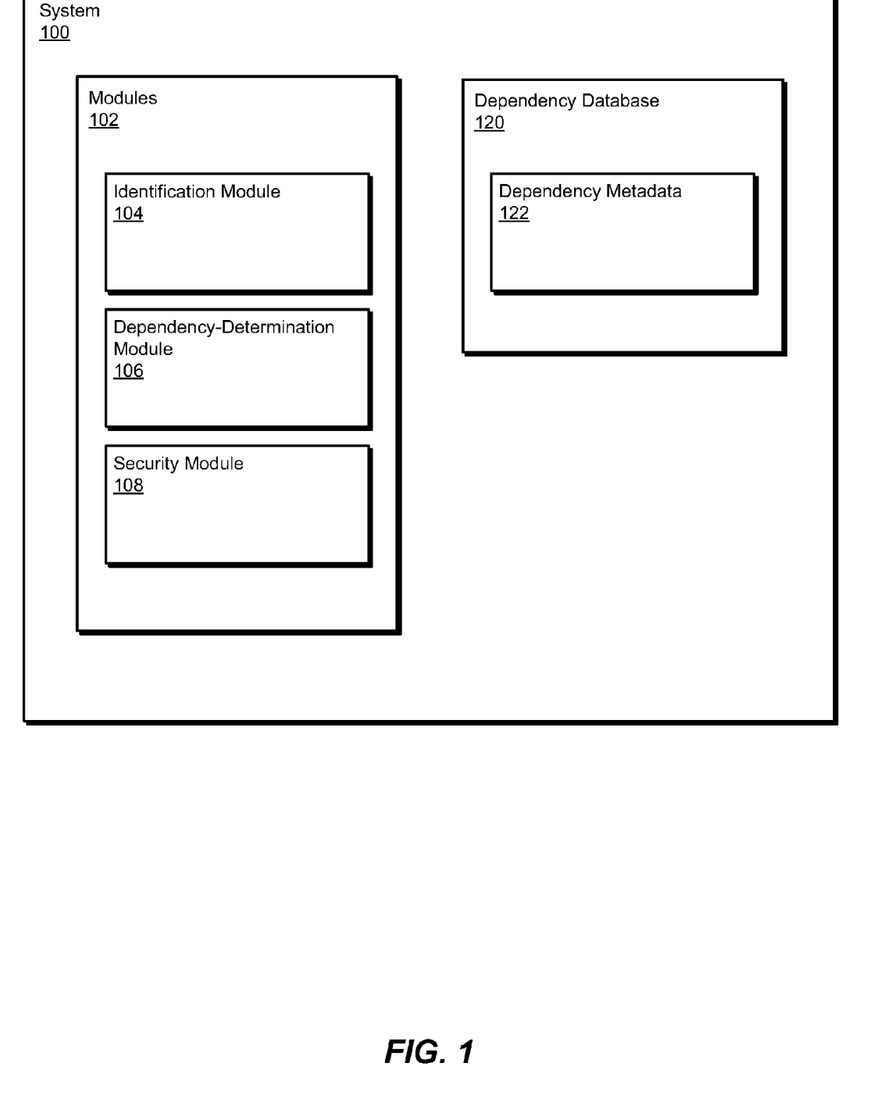
FIG. 1 is a block diagram of an exemplary system for exonerating untrusted software components.
Figure 2:
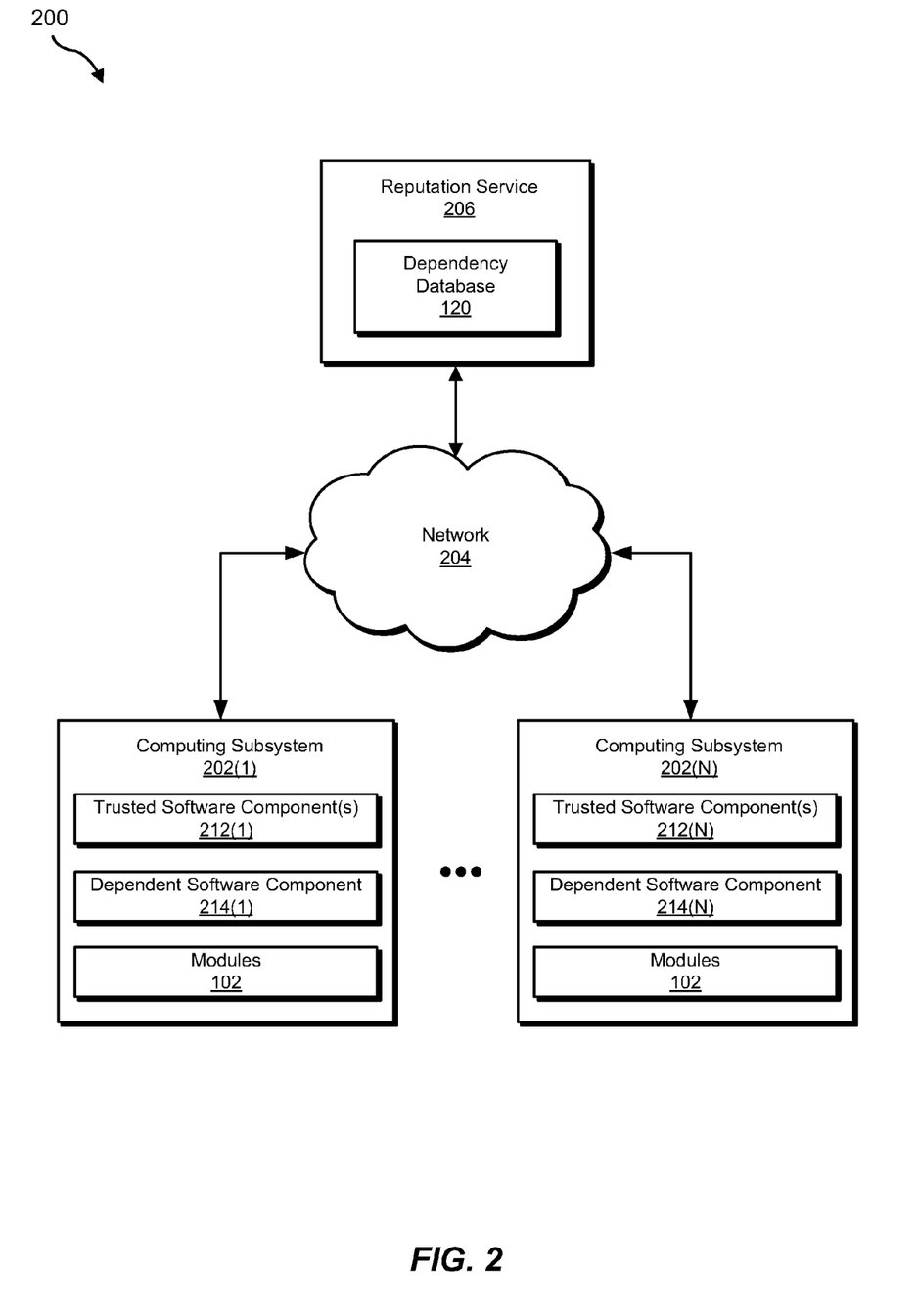
FIG. 2 is a block diagram of an exemplary system for exonerating untrusted software components.

The following will provide, with reference to FIGS. 1-2, detailed descriptions of exemplary systems for exonerating untrusted software components. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for exonerating untrusted software components. As illustrated in this figure, exemplary system 100 may include one or more modules 102 for performing one or more tasks. For example, and as will be explained in greater detail below, exemplary system 100 may include an identification module 104 programmed to identify or detect dependent software components. Exemplary system 100 may also include a dependency-determination module 106 programmed to determine whether a dependent software component represents a non-optional dependent component of at least one trusted software component.

In addition, and as will be described in greater detail below, exemplary system 100 may include a security module 108 programmed to classify dependent software components as trusted or malicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing subsystems 202(1)-(N) and/or reputation service 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases. For example, exemplary system 100 may include a dependency database 120 for storing dependency metadata 122 for one or more software components. As will be explained, dependent metadata 122 may include information that indicates whether a dependent software component represents a non-optional (i.e., "hard") dependency of one or more trusted software components.

Dependency database 120 may represent portions of a single database or computing device or a plurality of databases or computing devices. For example, dependency database 120 may represent a portion of reputation service 206 in FIG. 2, computing system 710 in FIG. 7, and/or portions of exemplary network architecture 800 in FIG. 8. Alternatively, dependency database 120 in FIG. 1 may represent one or more physically separate devices capable of being accessed by a computing device, such as reputation service 206 in FIG. 2, computing system 710 in FIG. 7, and/or portions of exemplary network architecture 800 in FIG. 8.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a plurality of computing subsystems 202(1)-(N) in communication with a reputation service 206 via a network 204. In one embodiment, computing subsystems 202(1)-(N) may be programmed to exonerate untrusted software components. For example, and as will be described in greater detail below, modules 102 from FIG. 1 may, when executed by computing subsystem 202(1), cause computing subsystem 202(1) to: 1) identify a dependent software component (such as dependent software component 214(1)), 2) determine that dependent software component 214(1) represents a non-optional dependent component of one or more trusted software components 212

(1) on computing subsystem 202(1), and then 3) classify dependent software component 214(1) as trusted.

Computing subsystems 202(1)-(N) generally represent any type or form of computing device capable of reading computer-executable instructions. Examples of computing subsystems 202(1)-(N) include, without limitation, laptops, desktops, servers, cellular phones, personal digital assistants (PDAs), multimedia players, embedded systems, combinations of one or more of the same, exemplary computing system 710 in FIG. 7, or any other suitable computing device. In some examples, computing subsystems 202(1)-(N) may represent all or a portion of a single community or a plurality of communities. For example, computing subsystems 202(1)-(N) may represent computing systems within a single or a plurality of user bases, a single or a plurality of enterprises, or portions or combinations of one or more of the same.

Reputation service 206 generally represents any type or form of computing subsystem used to generate and provide information that identifies a file's reputation or prevalence. In some examples, reputation service 206 may also collect and provide information that identifies a file's non-optional dependencies. As will be explained in greater detail below, in some examples reputation service 206 may generate such information by collecting, aggregating, and analyzing data from user devices within a community (such as, e.g., an enterprise or the user base of a security-software publisher).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing subsystems 202(1)-(N) and reputation service 206.

Figure 3:
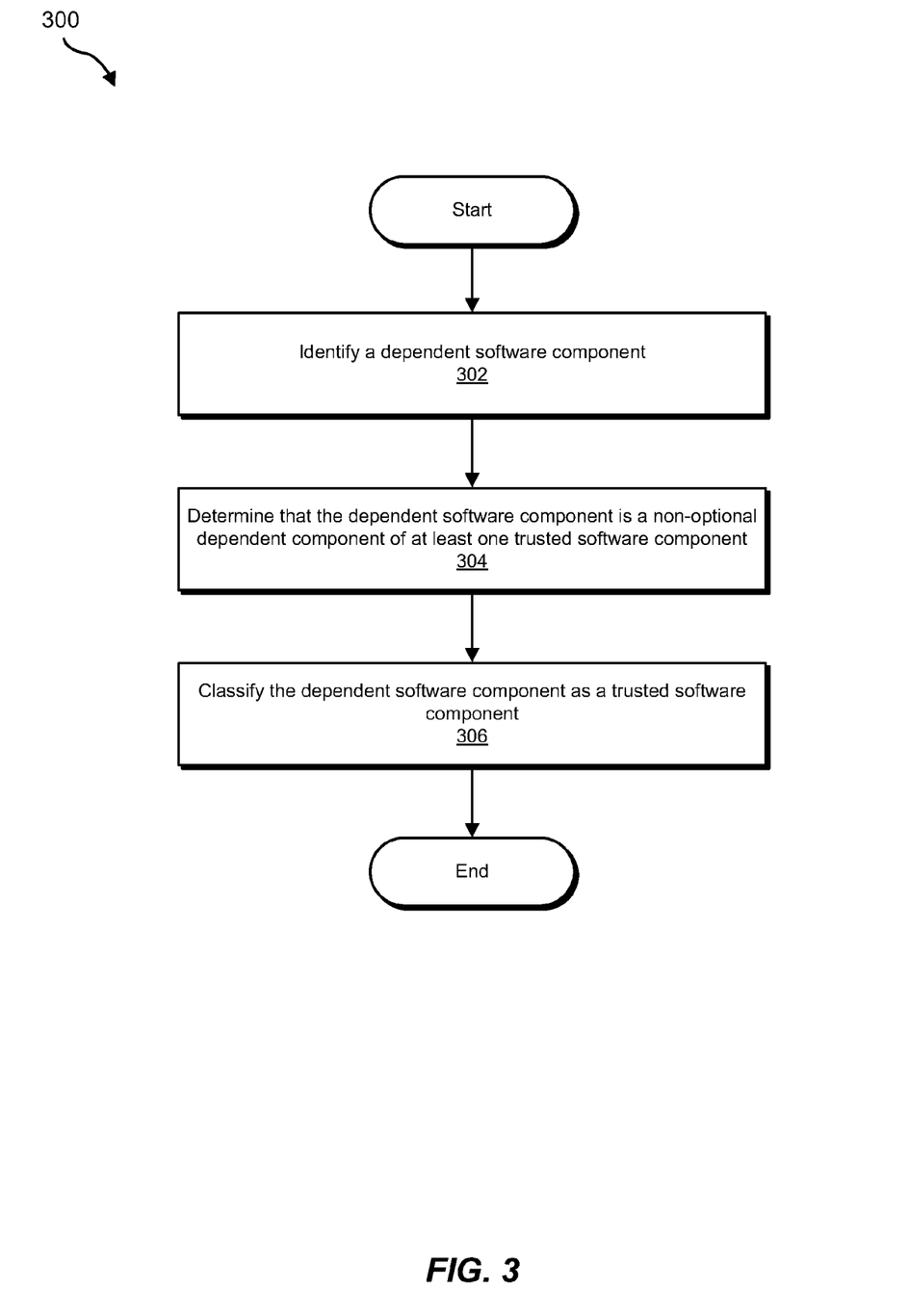
FIG. 3 is a flow diagram of an exemplary client-side method for exonerating untrusted software components.

FIG. 3 is a flow diagram of an exemplary computer-implemented method 300 for exonerating untrusted software components. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the various systems described herein may identify a dependent software component. For example, identification module 104 in FIG. 1 (which may, as detailed above, represent a portion of computing subsystem 202(1) in FIG. 2) may identify a dependent software component 214(1) on computing subsystem 202(1).

As detailed above, a dependent software component may represent a software package or file that contains code and/or data that may be shared or relied upon by independent processes or programs. Examples of dependent software components include, without limitation, shared objects and libraries such as DLLs and .so files. In some examples, the dependent component identified in step 302 may represent an untrusted software component (i.e., a component whose trust status has yet to be determined), such as an unsigned DLL.

Identification module 104 may perform step 302 in a variety of ways. In some examples, identification module 104 may identify or detect a dependent software component when it is loaded by a trusted process. For example, identification module 104 may, while monitoring trusted software component 402 ("editor.exe") in FIG. 4, detect or identify an attempt by trusted software component 402 to load dependent software component 404 ("printer.dll"). In some examples, dependent software component 404 may represent an unsigned DLL.

Returning to FIG. 3, at step 304 the various systems described herein may determine that the dependent software component identified in step 302 represents a non-optional dependent component of at least one trusted software component. For example, dependency-determination module 106 in FIG. 1 (which may, as detailed above, represent a portion of computing subsystem 202(1) in FIG. 2) may determine that dependent software component 214(1) represents a non-optional dependent component of one or more trusted software components 212(1) on computing subsystem 202(1).

Dependency-determination module 106 may perform step 304 in a variety of ways. In one example, dependency-determination module 106 may perform step 304 by determining whether the dependent software component is identified in a dependency list of a trusted process. For example, if identification module 104 detects an attempt by trusted software component 402 ("editor.exe") in FIG. 4 to load dependent software component 404 ("printer.dll," which may, as detailed above, represent an unsigned DLL), dependency-determination module 106 may determine whether dependent software component 404 is contained or identified on a dependency list 414 associated with trusted software component 402. The term "dependency list," as used herein, may refer to any type or form of data structure used to identify one or more dependencies of a software component. Examples of dependency lists include, without limitation, import address tables (IATs), file manifests (e.g., .NET manifests), or the like.

Figure 4:
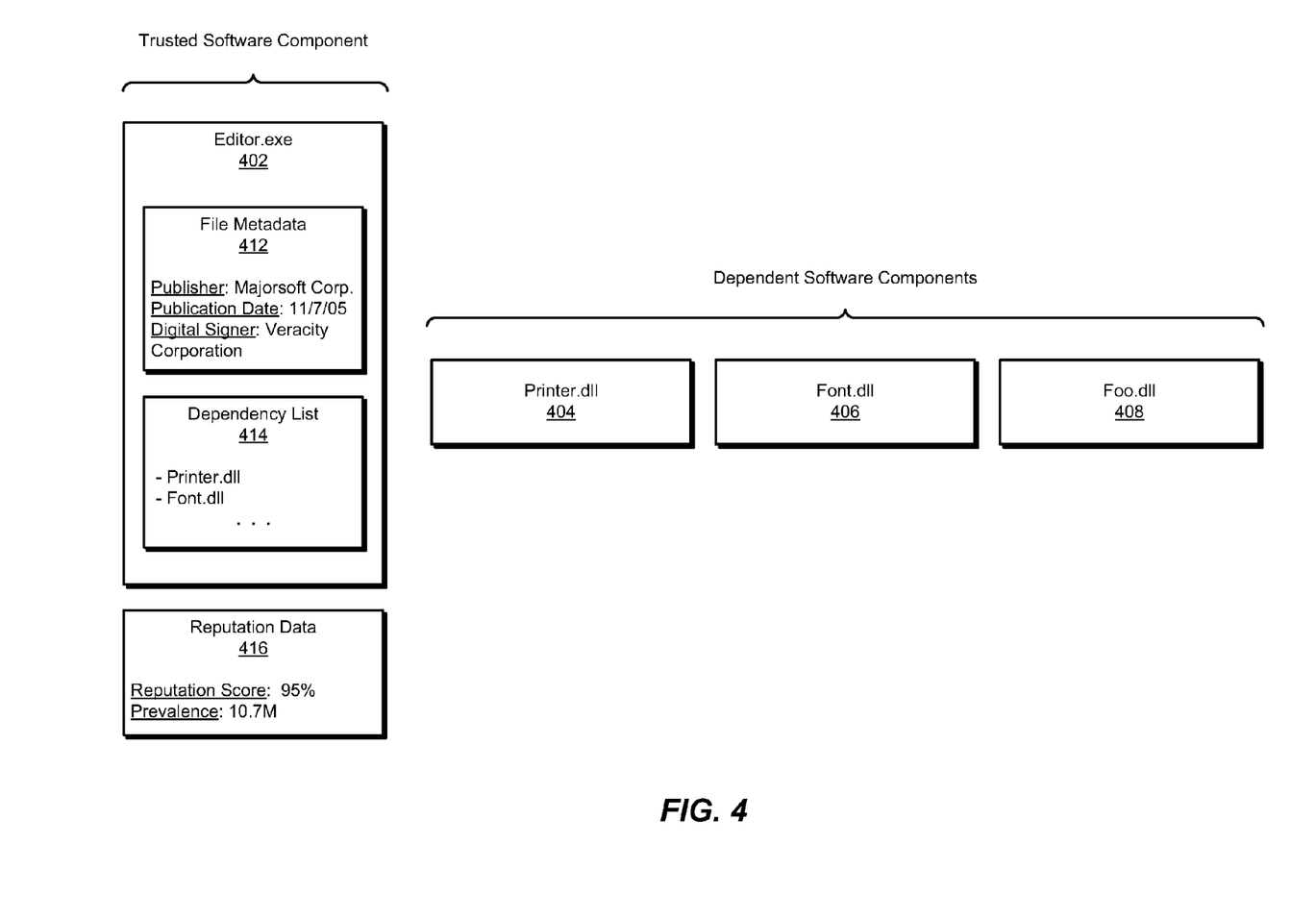
FIG. 4 is a block diagram of an exemplary trusted software component and dependent software component.

In the example illustrated in FIG. 4, dependency-determination module 106 may determine that dependent software component 404 represents a non-optional or "hard" dependency of a trusted software component since dependent software component 404 ("printer.dll") is identified on dependency list 414 of trusted software component 402. In contrast, if trusted software component 402 attempts to load dependent software component 408 ("foo.dll"), then dependency-determination module 106 may determine that dependent software component 408 does not represent a non-optional or "hard" dependency of trusted software component 402 since dependent software component 408 is not contained or identified in dependency list 414.

As detailed above, a "trusted software component" may refer to any legitimate or valid (i.e., non-malicious) software package or file. Examples of trusted software components include, without limitation, software components that have been digitally signed by a trusted entity, software components that have been scanned and exonerated by security software, and software components that have been assigned acceptable reputation scores by a reputation service, as discussed in greater detail below. In some examples, a trusted software component may represent the main assembly of .NET assembly. In this example, all other dependent assemblies of the .NET assembly may represent dependent software components.

In the example illustrated in FIG. 4, trusted software component 402 may represent a trusted software component since: 1) this component has been digitally signed by a reputable entity (in this example, "Majorsoft Corp.," as indicated in file metadata 412), 2) an instance of this component has previously been scanned or analyzed by security software (such as security module 108), and/or 3) reputation data 416 indicates that this component a) has been assigned a high reputation score (in this example, "95%") and b) is located on a large number of user devices within the community (in this example, 10.7 million devices).

Reputation data 416 for trusted software component 402 in FIG. 4 generally represents information that identifies a file's reputation or prevalence within a community (e.g., the user base of a security-software publisher). Examples of reputation data include, without limitation, reputation scores (where, for example, high reputation scores indicate that a file is generally trusted within a community and low reputation scores indicate that a file is generally untrusted within a community), prevalence information (e.g., information that identifies the number or percentage of user devices within a community that contain an instance of the file), or any other information that may be used to identify a community's opinion on the trustworthiness or legitimacy of a file, such as the file's location or origin, age, etc.

As detailed above, reputation services (such as reputation service 206 in FIG. 2) may generate reputation data for files by collecting, aggregating, and analyzing data from user devices within a community. Examples of data gathered from user devices within a community that may be used to generate reputation scores include, without limitation, information that identifies the overall health of a user device (i.e., information that identifies the performance, stability, and/or state of security of the user device), information that identifies the files stored on a user device, information that identifies the impact of a file on the health of the user device (e.g., information that identifies the health of a user device both before and after the file is stored on the user device), and any other information that may be used to evaluate the trustworthiness of a file. In some examples, by collecting, aggregating, and analyzing this data from potentially millions of user devices within a community (such as the user base of a security-software publisher), reputation services may be able to gain a fairly accurate understanding as to the trustworthiness of a file.

In another example of step 304 in FIG. 3, dependency-determination module 106 may determine whether a dependent software component represents a non-optional dependent component of at least one trusted software component by: 1) obtaining dependency metadata for the dependent software component from a reputation service and then 2) determining, by analyzing the dependency metadata, whether the dependent software component represents a non-optional dependent component of at least one trusted software component.

The term "dependency metadata," as used herein, generally refers to information that indicates whether a dependent software component represents a non-optional dependency of any trusted software components. In some examples, reputation service 206 may collect, aggregate, and analyze dependency metadata data from thousands or potentially millions of user devices within a community (such as the user base of a security-software publisher).

For example, dependency-determination module 106 may cause computing subsystem 202(1) in FIG. 2 to request dependency metadata from reputation service 206 for dependent software component 406 ("font.dll") in FIG. 4. In response to this request, and as will be described in greater detail below in connection with FIGS. 5 and 6, reputation service 206 may transmit dependency metadata for dependent software component 406 to computing subsystem 202(1). In this example, this dependency metadata may indicate that dependent software component 406 represents a non-optional dependent software component of trusted software component 402. Upon analyzing this information, dependency-determination module 106 may determine that dependent software component 404 represents a non-optional dependent component of a trusted software component.

Dependency-determination module 106 may perform step 304 in real time or in a low-priority or background process or thread. For example, dependency-determination module 106 may determine whether a dependent software component represents a non-optional component of a trusted process prior to allowing the trusted process to load the dependent software component. Alternatively, dependency-determination module 106 may allow a trusted process to load a dependent software component and then, using a low-priority or background thread, scan the trusted process' dependency list to determine whether the dependent software component is referenced in the dependency list.

Returning to FIG. 3, at step 306 the systems described herein may classify the dependent software component identified in step 302 as a trusted software component. For example, security module 108 in FIG. 1 (which may, as detailed above, represent a portion of computing subsystem 202(1) in FIG. 2) may classify dependent software component 404 ("printer.dll") in FIG. 4 as trusted since this component represents a non-optional dependency of trusted software component 402.

In some examples, security module 108 may exonerate a dependent software component based solely on a trusted software component's non-optional dependency on the dependent software component. For example, security module 108 may exonerate dependent software component 404 in FIG. 4 based solely on the fact that dependency list 414 of trusted software component 402 references dependent software component 404. As such, security module 108 may avoid scanning or performing other intrusive and/or resource-intensive security operations on dependent software component 404. Upon completion of step 306, exemplary method 300 in FIG. 3 may terminate.

In some examples, upon classifying the dependent software component as trusted in step 306, security module 106 may also: 1) identify at least one additional instance of the dependent software component loaded by one or more processes and then 2) classify these additional instances of the dependent software component as trusted. For example, security module 108 may: 1) identify all other instances of dependent software component 404 ("printer.dll") in FIG. 4 loaded by processes on computing subsystem 202(1) in FIG. 2 and then 2) classify these additional instances of printer.dll as trusted.

In some examples, the systems described herein may verify that the dependent software component identified in step 302 is stored in a single location on the computing device. For example, security module 108 may verify that computing subsystem 202(1) in FIG. 2 contains a single copy of dependent component 404 in a single location in order to prevent exploitation of a problem commonly known as "DLL Hell" in which multiple copies of a DLL may be located in various locations on a computing system.

As detailed above, in some examples the various steps of exemplary method 300 may be performed in real time. In such examples, upon classifying the dependent software component as trusted in step 306, security module 108 may allow the trusted software component to load the dependent software component. For example, upon determining that dependent software component 404 is identified in dependency list 414 of trusted software component 402, security module 108 may allow trusted software component 402 (process "editor.exe") to load dependent software component 404 ("printer.dll").

In some examples, upon classifying the dependent software component as trusted in step 306, dependency-determination module 106 may send information that identifies the dependent software component as a non-optional dependent component of at least one trusted software component to a reputation service. For example, dependency-determination module 106 from FIG. 1 may cause computing subsystem 202(1) in FIG. 2 to send information to reputation service 206 that identifies dependent software component 404 from FIG. 4 as a non-optional dependent component of trusted software component 402. In this example, this information may include the file name of trusted software component 402 and/or dependent software component 404, information that identifies a publisher of trusted software component 402 and/or dependent software component 404, information that identifies a publication date for trusted software component 402 and/or dependent software component 404, a hash of trusted software component 402 and/or dependent software component 404, and/or any other information that may be used to identify trusted software component 402 and/or dependent software component 404.

Figure 5:
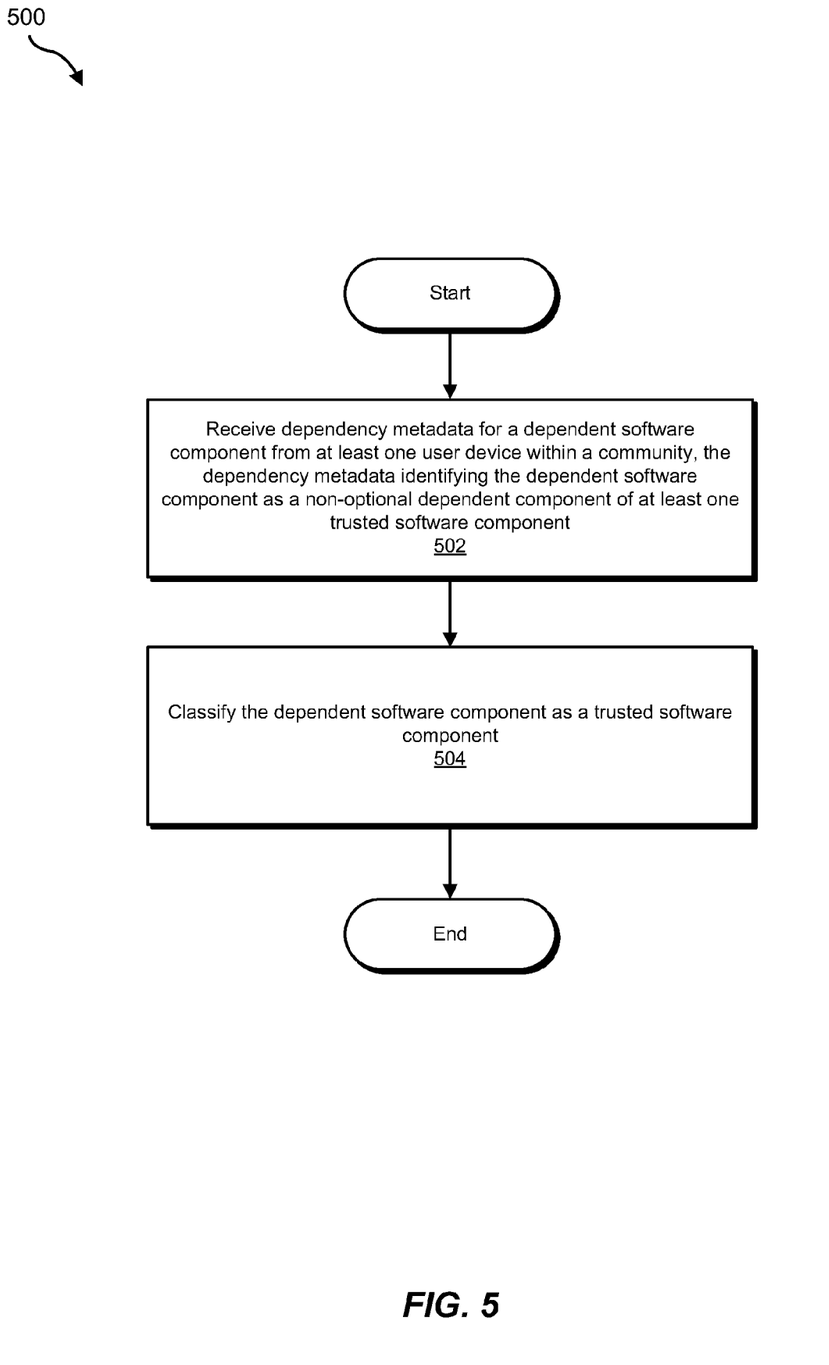
FIG. 5 is flow diagram of an exemplary server-side method for exonerating untrusted software components.
Figure 6:
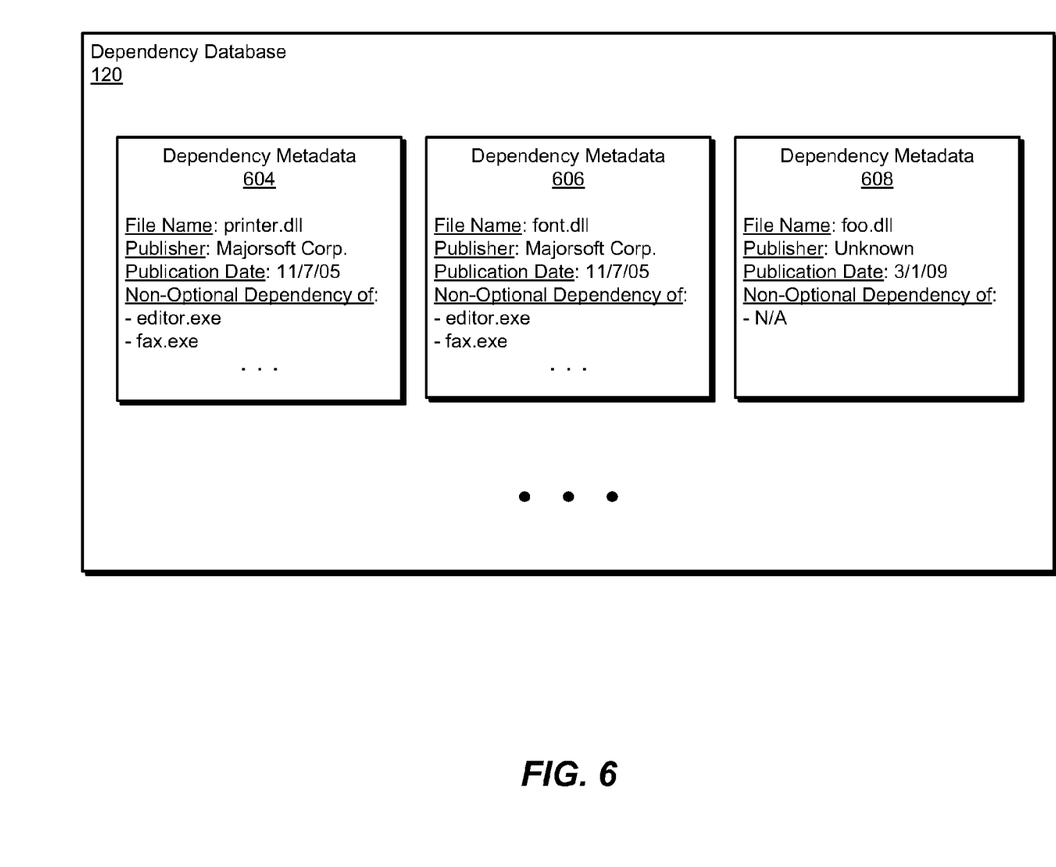
FIG. 6 is a block diagram illustrating dependency metadata that may be maintained by a reputation service.

As detailed above, the various principles disclosed herein may also enable a backend to collect and provide information that may be used to exonerate untrusted software components. FIG. 5 is a flow diagram of an exemplary computer-implemented method 500 for performing such a task. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2.

As illustrated in FIG. 5, at step 502 one or more of the systems described herein may receive dependency metadata for a dependent software component from at least one user device within a community. For example, reputation service 206 in FIG. 2 may receive dependency metadata for dependent software component 404 in FIG. 4 ("printer.dll") from computing subsystem 202(1) in FIG. 2. Reputation service 206 may then store this information as dependency metadata 604 in dependency database 120 in FIG. 6.

As detailed above, dependency metadata may contain information that identifies: 1) a dependent software component (using, for example, a hash or filename) and 2) one or more trusted software components that have a non-optional dependency on the dependent software component. Dependency metadata may also include the file name of these trusted software components and/or dependent software components, information that identifies a publisher of these trusted software components and/or dependent software components, information that identifies a publication date for these trusted software components and/or dependent software components, hashes of these trusted software components and/or dependent software components, and/or any other information that may be used to identify such trusted software components and/or dependent software components. For example, dependency metadata 604 in FIG. 6 for dependent software component 404 from FIG. 4 ("printer.dll") may indicate that the file "printer.dll" was published by "Majorsoft Corp." on 7 Nov. 2005. Dependency metadata 604 may also indicate that this file represents a non-optional dependency of the trusted processes "editor.exe" and "fax.exe."

At step 504, the systems described herein may classify the dependent software component identified in the dependency metadata received in step 502 as a trusted software component. For example, upon analyzing dependency metadata 604 in FIG. 6, reputation service 206 in FIG. 2 may classify dependent software component 404 ("printer.dll") as trusted since this component represents a non-optional dependent component of the trusted processes "editor.exe" and "fax.exe." Upon completion of step 504, exemplary method 500 in FIG. 5 may terminate.

As detailed above, reputation service 206 may provide dependency metadata for dependent software components to a plurality of user devices within a community. For example, at some later point in time reputation service 206 may receive a request from computing subsystem 202(N) in FIG. 2 for dependency metadata for dependent software component 404 in FIG. 4. In this example, reputation service 206 may, in response to this request, provide dependency metadata 604 from FIG. 6 to computing subsystem 202(N). As detailed above, this dependency metadata may indicate that dependent software component 404 represents a non-optional dependent component of a trusted software component (in this example, the trusted processes "editor.exe" and "fax.exe"). Computing subsystem 202(N) may then use this dependency metadata to exonerate instances of dependent software component 404 on computing subsystem 202(N), as detailed above.

By exonerating a dependent software component based solely on a trusted software component's non-optional or "hard" dependency on the dependent software component, the various systems and methods disclosed herein may quickly and efficiently exonerate dependent components by association without having to scan or perform other intrusive and/or resource-intensive security operations on the dependent software component. As such, these systems and methods may detect dependent-component-based security threats without unduly impacting system performance.

Figure 7:
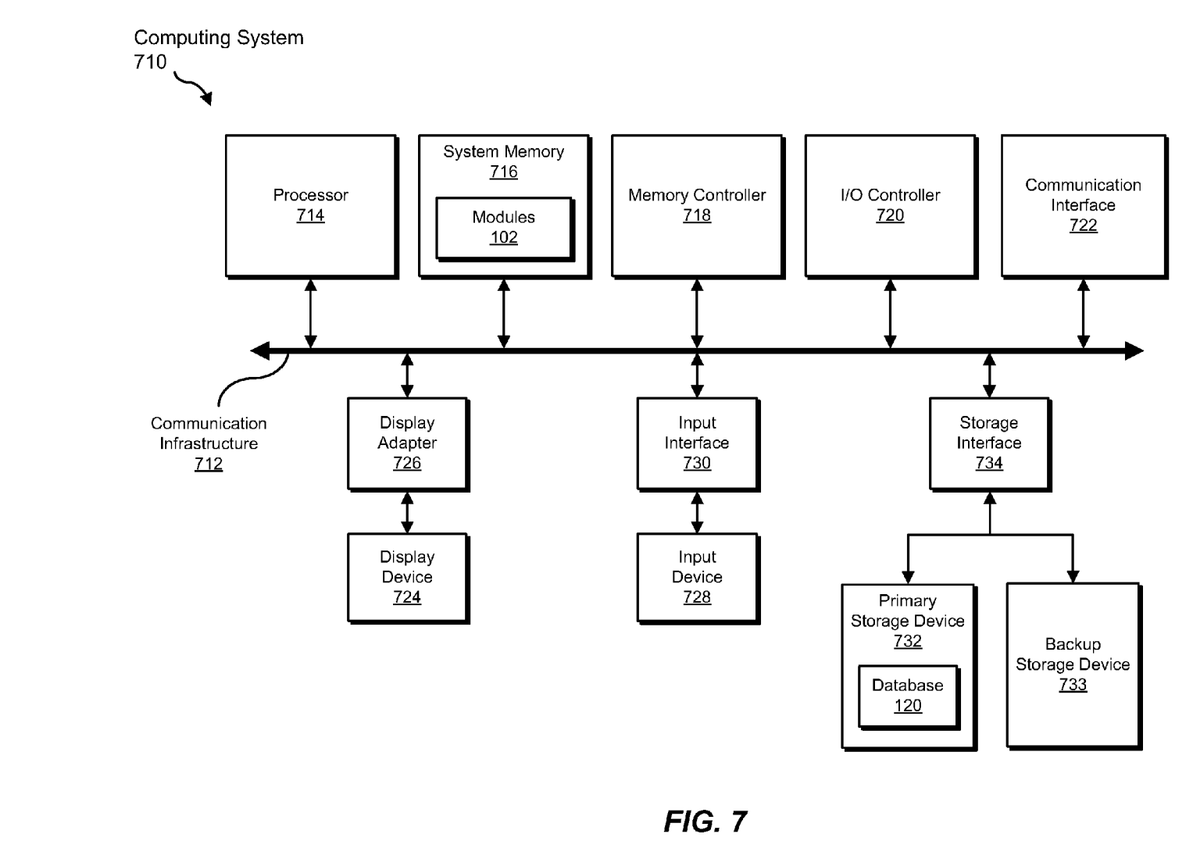
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, determining, classifying, detecting, obtaining, analyzing, exonerating, sending, and allowing steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as identifying, determining, classifying, detecting, obtaining, analyzing, exonerating, sending, and allowing.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, determining, classifying, detecting, obtaining, analyzing, exonerating, sending, and allowing steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, determining, classifying, detecting, obtaining, analyzing, exonerating, sending, and allowing steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, determining, classifying, detecting, obtaining, analyzing, exonerating, sending, and allowing steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, dependency database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, determining, classifying, detecting, obtaining, analyzing, exonerating, sending, and allowing steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
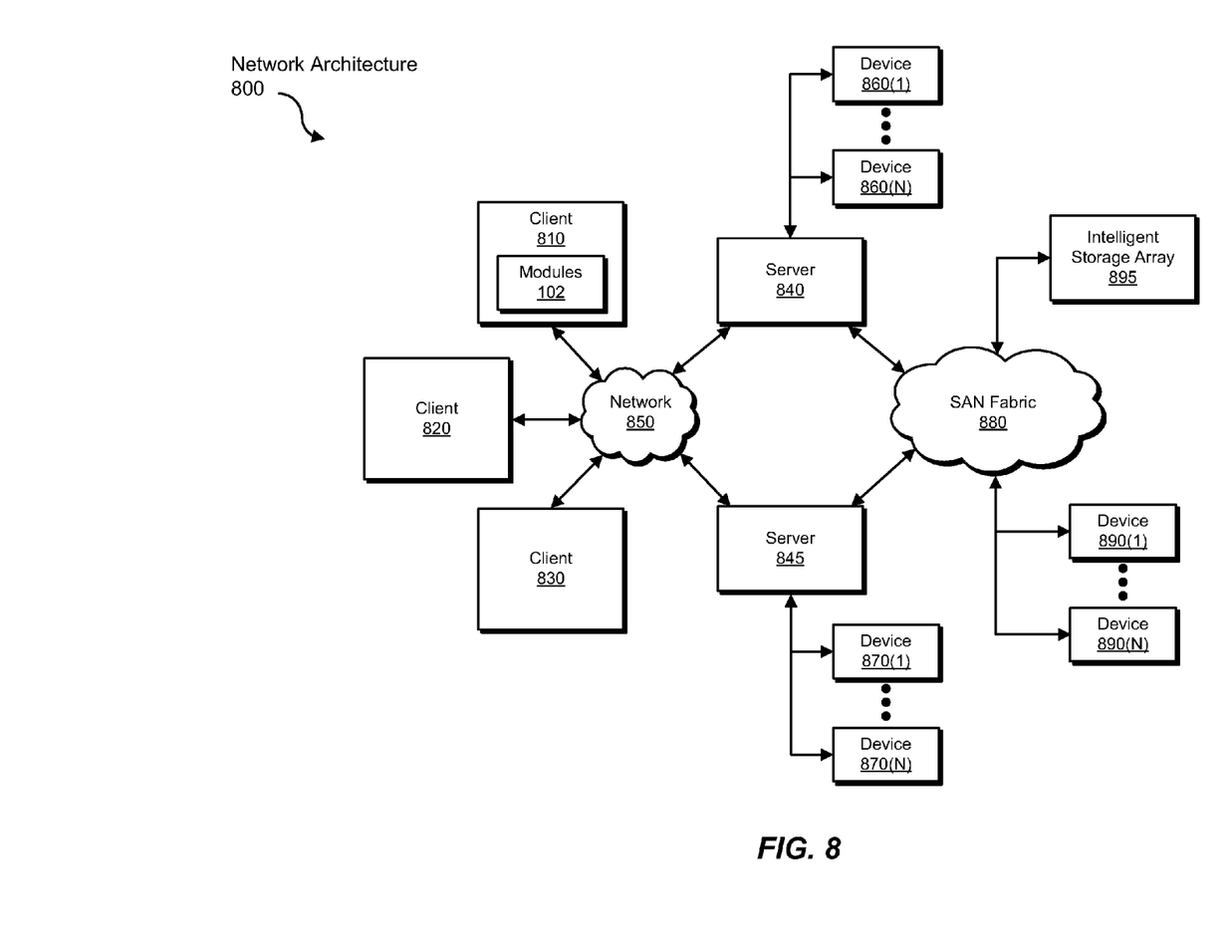
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include modules 102 from FIG. 1 while server 840 may include dependency database 120.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, determining, classifying, detecting, obtaining, analyzing, exonerating, sending, and allowing steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for exonerating untrusted software components. In one example, such a method may include: 1) identifying a dependent software component, 2) determining that the dependent software component is a non-optional dependent component of at least one trusted software component, and then 3) classifying the dependent software component as a trusted software component.

In one example, identifying the dependent software component may include detecting the dependent software component when the dependent software component is loaded by a trusted process on the computing device. In this example, determining that the dependent software component is a non-optional dependent component of at least one trusted software component may include determining that the dependent software component is a non-optional dependent component of the trusted process.

In some examples, determining that the dependent software component is a non-optional dependent component of at least one trusted software component may include determining that that the dependent software component is identified in a dependency list of at least one trusted software component. Examples of dependency lists include, without limitation, an import address table and a file manifest.

In at least one example, determining that the dependent software component is a non-optional dependent component of at least one trusted software component may include: 1) obtaining dependency metadata for the dependent software component from a reputation service and then 2) determining, by analyzing the dependency metadata, that the dependent software component is a non-optional dependent component of at least one trusted software component. In some examples, classifying the dependent software component as a trusted software component may include exonerating the dependent software component based solely on the trusted software component's non-optional dependency on the dependent software component.

In one example, the method may also include: 1) identifying at least one additional instance of the dependent software component loaded by a process on the computing device and then 2) classifying the additional instance of the dependent software component as a trusted software component. The method may also include determining that the dependent software component is stored in a single location on the computing device.

In some examples, the method may also include sending information that identifies the dependent software component as a non-optional dependent component of at least one trusted software component to a reputation service. The method may also include, upon classifying the dependent software component as a trusted software component, allowing the dependent software component to be loaded.

In one example, the dependent software component may represent an unsigned shared object. In other examples, the trusted software component may represent a main assembly and the dependent software component may represent a dependent assembly of the main assembly. The trusted software component may also represent a digitally signed software component, a software component that has been scanned and exonerated by security software, and/or a software component that has been assigned an acceptable reputation score by a reputation service.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, reputation service 206 may transform a characteristic or property of dependency database 120 by storing and/or modifying dependency data 122 in dependency database 120.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for exonerating digitally unsigned software components, the method comprising:
    identifying at least one digitally unsigned dependent software component in part by detecting an attempt by a trusted process to load the digitally unsigned dependent software component;
    determining, in response to detecting the attempt by the trusted process to load the digitally unsigned dependent software component, that the digitally unsigned dependent software component is a non-optional dependent component of the trusted process by identifying the digitally unsigned dependent software component in a dependency list associated with the trusted process;
    classifying the digitally unsigned dependent software component as a trusted software component based on the determination, using the dependency list, that the digitally unsigned dependent software component is a non-optional dependent component of the trusted process;

in response to classifying the digitally unsigned dependent software component as the trusted software component, sending information that identifies the digitally unsigned dependent software component as a non-optional dependent component of the trusted process to a reputation service to enable a computing device that receives the information to classify the digitally unsigned dependent software component as trusted.

2. The method of claim 1, wherein the digitally unsigned dependent software component is exonerated based solely on the non-optional dependency of the trusted process on the digitally unsigned dependent software component.

3. The method of claim 1, wherein the digitally unsigned dependent software component comprises a dynamically linked library.

4. The method of claim 1, wherein detecting the attempt by the trusted process to load the digitally unsigned dependent software component is performed while monitoring the trusted process.

5. The method of claim 1, further comprising:
identifying, upon classifying the digitally unsigned dependent software component as the trusted software component, at least one additional instance of the digitally unsigned dependent software component loaded by a process on the computing device;
exonerating the additional instance of the digitally unsigned dependent software component.

6. The method of claim 1, further comprising, prior to classifying the digitally unsigned dependent software component as the trusted software component, verifying that the digitally unsigned dependent software component is stored in a single location on the computing device.

7. The method of claim 1, wherein the dependency list comprises an import address table.

8. The method of claim 1, further comprising, upon classifying the digitally unsigned dependent software component as the trusted software component, allowing the digitally unsigned dependent software component to be loaded.

9. The method of claim 1, wherein the digitally unsigned dependent software component comprises a shared object.

10. The method of claim 1, wherein the digitally unsigned dependent software component has at least one of:
not been scanned and exonerated by security software;
not been assigned an acceptable reputation score by the reputation service.

11. The method of claim 1, wherein the information comprises a file name of the trusted process and a file name of the digitally unsigned dependent software component.

12. The method of claim 1, wherein the trusted process is trusted due to at least one of:
being digitally signed by a trusted entity;
having been scanned and exonerated by security software;
having been assigned an acceptable reputation score by the reputation service.

13. A non-transitory computer-readable medium comprising one or more computer-executable instructions that, when executed by at least one processor of a computing device, cause the computing device to:
identify at least one digitally unsigned dependent software component in part by detecting an attempt by a trusted process to load the digitally unsigned dependent software component;
determine, in response to detecting the attempt by the trusted process to load the digitally unsigned dependent software component, that the digitally unsigned dependent software component is a non-optional dependent component of the trusted process by identifying the digitally unsigned dependent software component in a dependency list associated with the trusted process;
classify the digitally unsigned dependent software component as a trusted software component based on the determination, using the dependency list, that the digitally unsigned dependent software component is a non-optional dependent component of the trusted process;
in response to classifying the digitally unsigned dependent software component as the trusted software component, send information that identifies the digitally unsigned dependent software component as a non-optional dependent component of the trusted process to a reputation service to enable a computing device that receives the information to classify the digitally unsigned dependent software component as trusted.

14. The non-transitory computer-readable medium of claim 13, wherein the computer-executable instructions, when executed by at least one processor of the computing device, cause the computing device to exonerate the digitally unsigned dependent software component based solely on the non-optional dependency of the trusted process on the digitally unsigned dependent software component.

15. The non-transitory computer-readable medium of claim 13, wherein the digitally unsigned dependent software component comprises a dynamically linked library.

16. The non-transitory computer-readable medium of claim 13, wherein the computer-executable instructions, when executed by at least one processor of the computing device, cause the computing device to, upon classifying the digitally unsigned dependent software component as the trusted software component, allow the digitally unsigned dependent software component to be loaded.

17. A system for exonerating digitally unsigned software components, the system comprising:
an identification module, stored in memory, that identifies at least one digitally unsigned dependent software component in part by detecting an attempt by a trusted process to load the digitally unsigned dependent software component;
a dependency-determination module, stored in memory, that determines that the digitally unsigned dependent software component is a non-optional dependent component of the trusted process by identifying the digitally unsigned dependent software component in a dependency list associated with the trusted process;
a security module, stored in memory, that classifies the digitally unsigned dependent software component as a trusted software component based on the determination, using the dependency list, that the digitally unsigned dependent software component is a non-optional dependent component of the trusted process;
at least one processor configured to execute the identification module, the dependency-determination module, and the security module, wherein:
the dependency-determination module, in response to the security module classifying the digitally unsigned dependent software component as the trusted software component, sends information that identifies the digitally unsigned dependent software component as a non-optional dependent component of the trusted process to a reputation service to enable a computing device that receives the information to classify the digitally unsigned dependent software component as trusted.

* * * * *